(12) United States Patent
Sun et al.

(10) Patent No.: US 8,426,801 B2
(45) Date of Patent: Apr. 23, 2013

(54) SHADING MEMBER OF ROTATOR TYPE OPTICAL SENSING DEVICE

(75) Inventors: Tsung-Ting Sun, Taipei (TW); Chung-Ping Feng, Hsinchu County (TW); Peng-Yu Chen, Taipei (TW)

(73) Assignee: Edison Opto Corporation, Taipei Hsien (TW)

( * ) Notice: Subject to any disclaimer, the term of this patent is extended or adjusted under 35 U.S.C. 154(b) by 448 days.

(21) Appl. No.: 12/757,434

(22) Filed: Apr. 9, 2010

(65) Prior Publication Data
US 2011/0192963 A1    Aug. 11, 2011

(30) Foreign Application Priority Data
Feb. 11, 2010    (TW) ................................ 99104374 A

(51) Int. Cl.
*G01D 5/34*    (2006.01)
(52) U.S. Cl.
USPC ........................................ 250/231.1; 341/13
(58) Field of Classification Search ............ 250/231.13–231.18, 237 G, 237 R; 356/616–619; 341/11, 13, 31; 359/436–442, 359/566
See application file for complete search history.

(56) References Cited

U.S. PATENT DOCUMENTS

| | | | |
|---|---|---|---|
| 8,184,278 B2* | 5/2012 | Feng et al. | 356/139.1 |
| 2011/0192960 A1* | 8/2011 | Feng et al. | 250/214 R |
| 2011/0272562 A1* | 11/2011 | Chen et al. | 250/216 |

* cited by examiner

*Primary Examiner* — Francis M Legasse, Jr.
(74) *Attorney, Agent, or Firm* — Rosenberg, Klein & Lee

(57)    ABSTRACT

An optical sensing device includes a shell, at least one light emitting member, a rotator type shading member and at least one optical sensing member. The shell is formed with a blackbody condition space having a light emitting chamber, a shading chamber and at least one optical sensing chamber. The light emitting member projects a light beam. The rotator type shading member is rotatably restrained within the shading chamber, and has a geometric center and a weight center offset from the geometric center. When the optical sensing device is lifted in a lifting azimuth or lowered in a lowering azimuth, the rotator type shading member is rotated by the geometric center to make the weight center located in the lowering azimuth with respect to the geometric center. The optical sensing member is arranged in the optical sensing chamber, and senses the light beam to accordingly send out a sensing signal.

7 Claims, 9 Drawing Sheets

SHADING MEMBER OF ROTATOR TYPE OPTICAL SENSING DEVICE

This application claims the benefit of Taiwan Patent Application Serial No. 099104374, filed Feb. 11, 2010, the subject matter of which is incorporated herein by reference.

FIELD OF THE INVENTION

The present invention relates to an optical sensing device, and more particularly to a rotator type optical sensing device.

BACKGROUND OF THE INVENTION

In daily life, it is usually necessary to use some sensors to obtain the inclined angle or the movement data of an object. These sensors usually can provide the functions of sensing horizontal movement, vertical movement or inclined angle. Practically, many sensing technologies, such as optical sensing technologies, sound wave sensing technologies, or electrical sensing technologies, may be applied to these sensors. Among these sensing technologies, the optical sensing technologies have the advantage of rapid sensing, so that the optical sensing technologies are widely applied to manufacture some optical sensing devices with high sensing sensitivity.

Among the present optical sensing devices, most of them are provided with a shell having a black-body condition space therein. In the black-body condition space, a light emitting member, a shading member and at least one optical sensing member are arranged, so as to make sure that the optical sensing can exactly execute the function of optical sensing without being interfered by the light pollution generated from the outer environment.

In the optical sensing device, the light emitting member projects a light beam. The shading member is movably arranged within the black-body condition space, so as to move by the action of gravity or inertial force when the optical sensing device is moved or tilted, and further to accordingly change the relative position of the shading member with respect to the light emitting member and the optical sensing member.

When the relative position of the shading member with respect to the light emitting member and the optical sensing member is changed, the reflection angle and the path of the light beam are also be changed to make the intensity of the light beam, that the optical sensing member senses, is changed together with above changes, so as to accordingly judge or calculate the parameters of horizontal movement, vertical movement, and the inclination angle, etc.

However, in above conventional optical sensing technology, it is unavoidable that exists a problem that the noise is generated when the shading member moves in the shading chamber to impact the inner wall of the shading chamber. Under the influence of the noise, it also makes the user be confused with the problem that whether the noise is caused by normal impact or caused by abnormal looseness of inner components, and further brings more troubles in maintenance.

SUMMARY OF THE INVENTION

Due to that there is a serious problem that the noise brings more troubles in maintenance in the prior arts, the primary objective of the present invention is to provide a optical sensing device, in which a rotator type shading member is arranged in the shading chamber to replace the conventional movable type shading member, so as to make the rotator type shading member rotate to the azimuth according to the variation caused by gravity action when the optical sensing device is inclined due to lifting or lowering, and further to sense the inclination azimuth of the optical sensing device.

Means of the present invention for solving the problems as mentioned above provides an optical sensing device, which comprises a shell, at least one light emitting member, a rotator type shading member and at least one optical sensing member. The shell is formed with a black-body condition space having a light emitting chamber, a shading chamber and at least one optical sensing chamber. The light emitting member projects a light beam. The rotator type shading member is rotatably restrained within the shading chamber, and has a geometric center and a weight center offset from the geometric center. When the optical sensing device is lifted in a lifting azimuth or lowered in a lowering azimuth, the rotator type shading member is rotated by the geometric center to make the weight center located in the lowering azimuth with respect to the geometric center. The optical sensing member is arranged in the optical sensing chamber, and senses the light beam to accordingly send out a sensing signal.

In the preferred embodiment of the present invention, the optical sensing device further comprises a circuit board, and the shell is assembled with the circuit board to form the black-body condition space therein. An anti-static member is further arranged in the shading member to ground a static electricity generated when the shading member rotates in the shading chamber. The light emitting member can be a light emitting diode (LED), and the optical sensing member can be a photo transistor or a photo diode.

Furthermore, in the preferred embodiment of the present invention, it is preferable that the volume of the rotator type shading member is approximate to the capacity of the shading chamber to make the rotator type shading member just be able to rotate within the shading chamber. The rotator type shading member has a first weight portion and a second weight portion. The weight, the specific weight and the volume of the first weight portion can be respectively greater than the weight, the specific weight and the volume of the second weight portion. Moreover, the first weight portion has a first shading surface, the second weight portion has a second shading surface, and the area of the first shading surface is greater than the area of the second shading surface. The rotator type shading member further has a lowering inclined surface gradually lowering from the first weight portion to the second weight portion, and the lowering inclined surface is at least one of a linear lowering inclined surface, a concave lowering inclined surface and a convex lowering inclined surface.

Comparing with the optical sensing device as disclosed in prior arts, in the present invention, an rotator type shading member is arranged in the shading chamber to replace the conventional movable type shading member; therefore, it is able to sense the inclination azimuth of the optical sensing device via the rotation of the rotator type shading member, so as to reduce the generation of the noise caused by that the shading member impacts the inner wall of the shading chamber, and further to prevent from the troubles in use or maintenance caused by the noise.

The devices, characteristics, and the preferred embodiments of this invention are described with relative figures as follows.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

The optical sensing device as provided in accordance with the present invention can be widely applied to sense the movement or the inclined angle of many kinds of objects, and the combined applications of the present invention are too numerous to be enumerated and described, so that only five preferred embodiments are disclosed as follows for representation.

Figure 1:
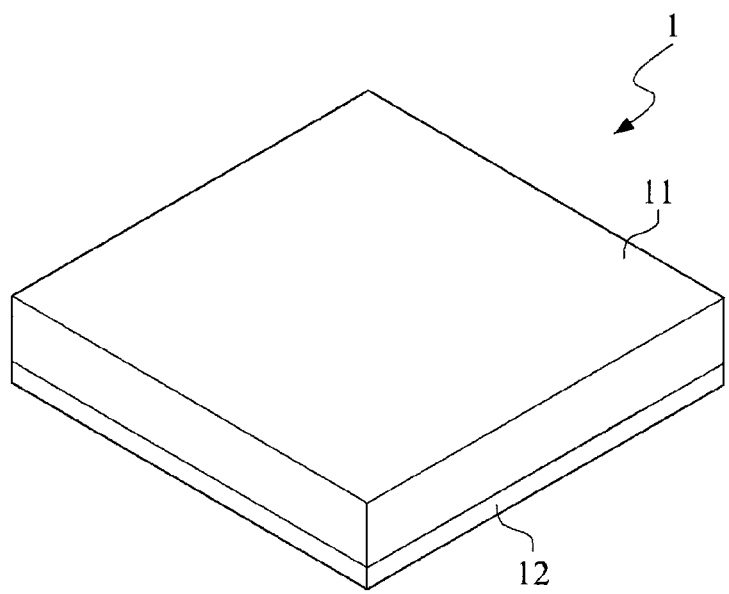
FIG. 1 is a perspective view of an optical sensing device in accordance with a first embodiment of the present invention.
Figure 2:
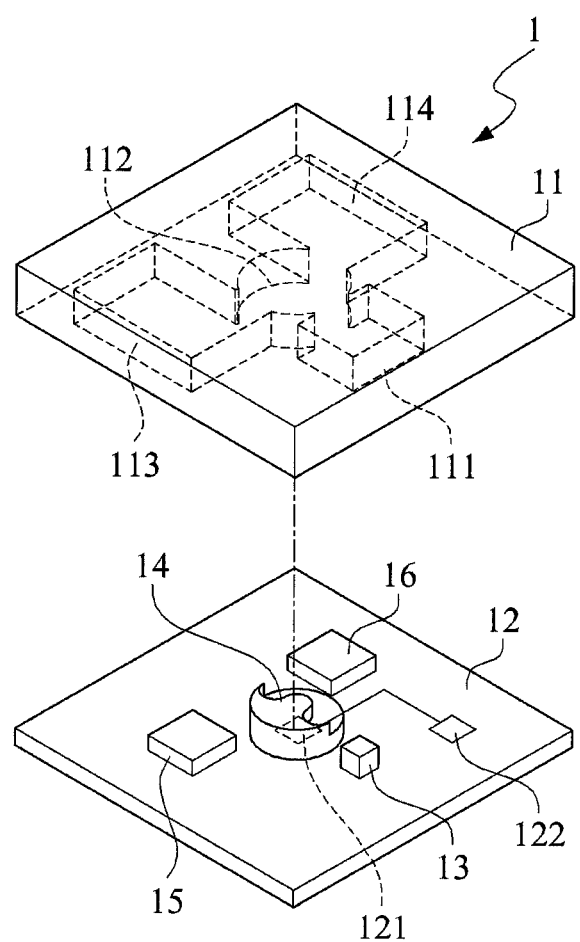
FIG. 2 is a perspective view of the optical sensing device after the shell is apart from the circuit board in accordance with the first embodiment of the present invention.
Figure 3:
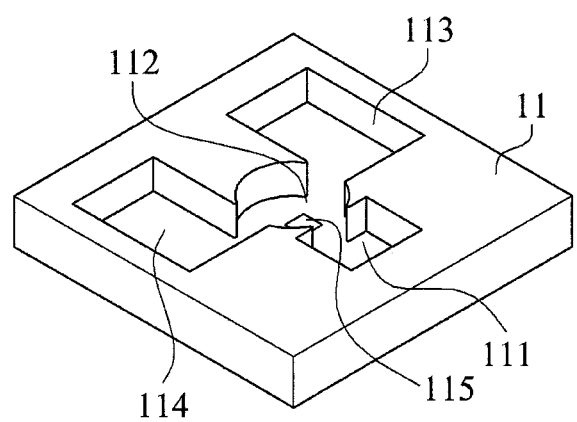
FIG. 3 illustrates the structure of the shell in accordance with the first embodiment of the present invention.
Figure 4:
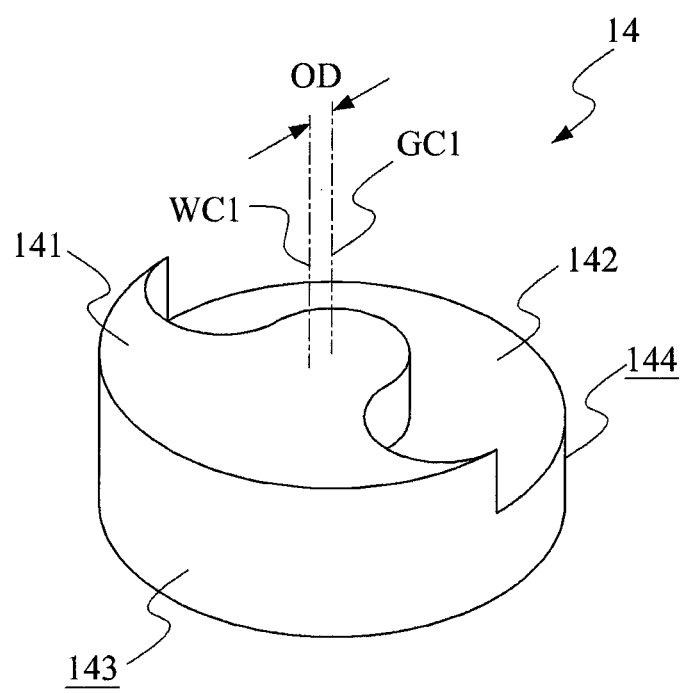
FIG. 4 illustrates the structure of the rotator type shading member in accordance with the first embodiment of the present invention.
Figure 5:
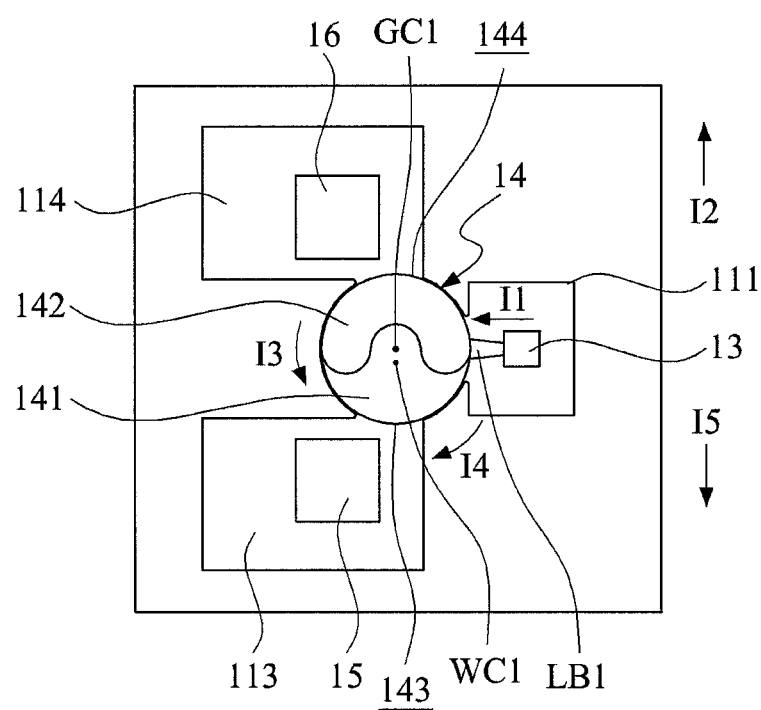
FIG. 5 illustrates the working principle in accordance with the first embodiment of the present invention.

Please refer to FIG. 1 to FIG. 5, wherein FIG. 1 is a perspective view of an optical sensing device in accordance with a first embodiment of the present invention; FIG. 2 is a perspective view of the optical sensing device after the shell is apart from the circuit board in accordance with the first embodiment of the present invention; FIG. 3 illustrates the structure of the shell in accordance with the first embodiment of the present invention; FIG. 4 illustrates the structure of the rotator type shading member in accordance with the first embodiment of the present invention; and FIG. 5 illustrates the working principle in accordance with the first embodiment of the present invention.

As shown in FIG. 1 to FIG. 5, an optical sensing device 1 comprises a shell 11, a circuit board 12, a light emitting member 13, a rotator type shading member 14 and two optical sensing members 15 and 16. The shell 11 and the circuit 12 are assembled with each other to form a black-body condition space therein. As shown in FIG. 3, the black-body condition space has a light emitting chamber 111, a shading chamber 112, and two optical sensing chambers 113 and 114. The shading chamber 112 is spatially communicated with the light emitting chamber 111, and the optical sensing chambers 113 and 114. An anti-static member 115 is arranged in the shading chamber 112. Furthermore, the anti-static member 115 can be an anti-static coating partially or fully coated on an inner wall of the shading chamber 112.

The circuit board 12 is arranged with another anti-static member 121 and a grounding circuit 122, and the anti-static members 115 and 121 are electrically connected with the grounding circuit 122, so as to keep the anti-static members 115 and 121 in a grounding situation. Meanwhile, the anti-static member 121 is arranged on the circuit board 12 with respect to the shading chamber 112, and can be an anti-static circuit or an anti-static layer. When the anti-static member 115 is an anti-static coating, it can be extended out from the shading chamber 112 to contact with the grounding circuit 122 of the circuit board 12. The light emitting member 13 is arranged in the light emitting chamber 111, and can be a light emitting diode (LED). The rotator type shading member 14 is rotatably restrained in the shading chamber 112. In other words, the rotator type shading member 14 is restrained in the condition that it only can rotate within the shading chamber 112. More preferably, the volume of the rotator type shading member 14 is approximate to the capacity of shading chamber 112, so as to make the rotator type shading member 14 only rotates in the shading chamber 112.

The rotator type shading member 14 has a geometric center GC1 and a weight center WC1 offset from the geometric center GC1 in an offset distance OD. The rotator type shading member 14 has a first weight portion 141 and a second weight portion 142. The weight, specific weight, and the volume of the first weight portion 141 is greater than that of the second weight portion 142, and the weight center WC1 is located in the first weight portion 141. The first weight portion 141 has a first shading surface 143, the second weight portion 142 has a second shading surface 144, and the area of the first shading surface 143 is greater than the area of the second shading surface 144. Preferably, after the rotator type shading member 14 is arranged in the shading chamber 112, the first shading surface 143 almost fully covers the gap between the shell 11 and the circuit board 12 in height, but the second shading surface 144 just partially covers the gap between the shell 11 and the circuit board 12 in height.

When the rotator type shading member 14 rotates in the shading chamber 112, it always keeps in contacting with at least one of the anti-static members 115 and 121. The optical sensing members 15 and 16 are respectively arranged in the optical sensing chambers 113 and 114, and either one of them can be a photo transistor or a photo diode. Though that in the first embodiment, it is necessary to electrically connect both the anti-static members 115 and 121 to the grounding circuit 122; in practical applications, it is also unnecessary to provide the anti-static function by electrically connected to the grounding circuit 122 if the anti-static members 115 and 121 themselves have sufficient ability of absorbing or reducing the static electricity.

An object (not shown), which needs to be sensed, can be an electronic device, such as a digital camera, a personal digital assistant (PDA), or a mobile phone. When the optical sensing device 1 is operated to sense the inclination azimuth of the object, it is able to embed the optical sensing device 1 into the object or connect the optical sensing device 1 to the object, and make the light emitting member 13 project at least one light beam LB1 into the light emitting chamber 111 along a projection direction I1. At this moment, the light beam LB1 projects to the rotator type shading member 14 restrained in the shading chamber 112 along the projection direction I1, illuminates the black-body condition space after being reflected from the rotator type shading member 14 or the inner wall of the shell 11 for at least one time, and is further sensed by the optical sensing members 15 and 16.

As shown in FIG. 5, when the object is lifted in a lifting azimuth I2, the lifting azimuth I2 of the optical sensing device 1 is lifted to make optical sensing device 1 inclined, and further to make the rotator type shading member 14 suffer a gravity action. When the rotation torque, obtained from the product of the component of the gravity force, along the surface that the rotator type shading member 14 contacts with the circuit 12, and the offset distance OD, is greater than the resistance torque provided by the friction between the rotator type shading member 14 and the circuit board 12 or between the rotator type shading member 14 and the inner wall of the shading chamber 112, the rotator type shading member 14 rotates along a rotation direction I3 or another rotation direction I4 to make the weight center WC1 located in a lowering azimuth I5, opposite to the lifting azimuth I2, with respect to the geometric center GC1 to form a shading condition. Under this shading condition, the first shading surface 143 almost fully shades the passage between the shading chamber 112 and the optical sensing chamber 113, so as to make the optical sensing member 15 located in the optical sensing chamber 113 hardly sense the light beam LB1. On the contrary, the second shading surface 144 just partially shades the passage between the shading chamber 112 and the optical sensing chamber 114, so as to make the optical sensing member 16 located in the optical sensing chamber 114 be capable of sensing larger intensity of the light beam LB1, and to accordingly send out a sensing signal to obtain the inclination azimuth, which can be presented in either the lifting azimuth or the lowering azimuth, of the object.

Similarly, when the object is lowered in a lowering azimuth I5, the lowering azimuth I5 of the optical sensing device 1 is lowered to make optical sensing device 1 inclined, and further to make the rotator type shading member 14 suffer the gravity action. When the rotation torque, obtained from the product of the component of the gravity force, along the surface that the rotator type shading member 14 contacts with the circuit 12, and the offset distance OD, is greater than the resistance torque provided by the friction between the rotator type shading member 14 and the circuit board 12 or between the rotator type shading member 14 and the inner wall of the shading chamber 112, the rotator type shading member 14 also rotates along the rotation direction I3 or the other rotation direction I4 to make the weight center WC1 located in the lowering azimuth I5 with respect to the geometric center GC1 to form the shading condition.

Figure 6:
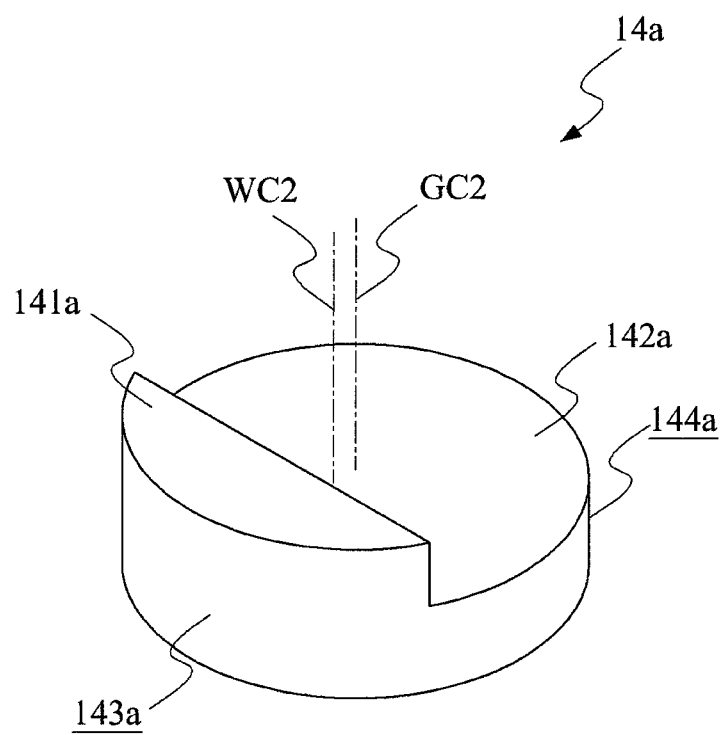
FIG. 6 illustrates the structure of the rotator type shading member in accordance with a second embodiment of the present invention.

Please refer to FIG. 6, which illustrates the structure of the rotator type shading member in accordance with a second embodiment of the present invention. In the second embodiment, another rotator type shading member 14a is applied to replace the rotator type shading member 14 as mentioned in the first embodiment. The rotator type shading member 14a has a geometric center GC2 and a weight center WC2 offset from the geometric center GC2. The rotator type shading member 14a has a first weight portion 141a and a second weight portion 142a. The weight, specific weight, and the volume of the first weight portion 141a is greater than that of the second weight portion 142a. The first weight portion 141a has a first shading surface 143a, the second weight portion 142a has a second shading surface 144a, and the area of the first shading surface 143a is greater than the area of the second shading surface 144a. Preferably, after the rotator type shading member 14a is arranged in the shading chamber 112, the first shading surface 143a almost fully covers the gap between the shell 11 and the circuit board 12 in height, but the second shading surface 144a just partially covers the gap between the shell 11 and the circuit board 12 in height.

Figure 7:
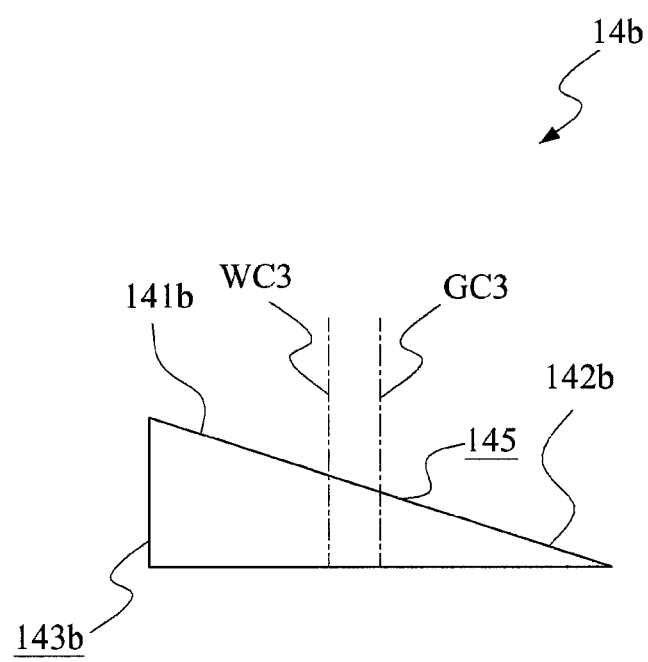
FIG. 7 illustrates the side view of the rotator type shading member in accordance with a third embodiment of the present invention.

Please refer to FIG. 7, which illustrates the side view of the rotator type shading member in accordance with a third embodiment of the present invention. In the third embodiment, another rotator type shading member 14b is applied to replace the rotator type shading member 14 as mentioned in the first embodiment. The rotator type shading member 14b has a geometric center GC3 and a weight center WC3 offset from the geometric center GC3. The rotator type shading member 14b has a first weight portion 141b and a second weight portion 142b. The weight, specific weight, and the volume of the first weight portion 141b is greater than that of the second weight portion 142b. The first weight portion 141b has a first shading surface 143b. The rotator type shading member 14b further has a lowering inclined surface 145 gradually lowering from the first weight portion 141b to the second weight portion 142b, and the lowering inclined surface 145 is a linear lowering inclined surface.

Figure 8:
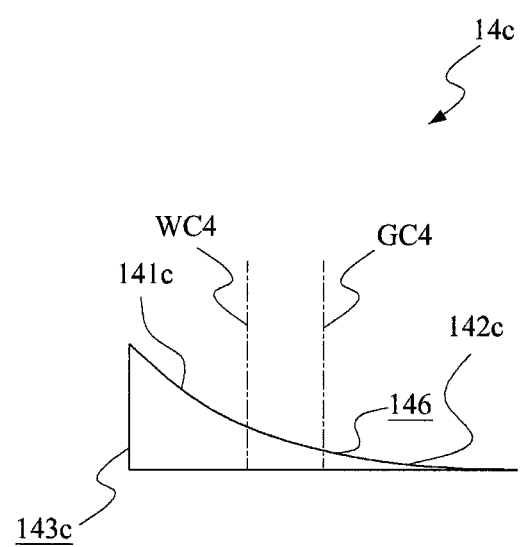
FIG. 8 illustrates the side view of the rotator type shading member in accordance with a fourth embodiment of the present invention.

Please refer to FIG. 8, which illustrates the side view of the rotator type shading member in accordance with a fourth embodiment of the present invention. In the fourth embodiment, another rotator type shading member 14c is applied to replace the rotator type shading member 14 as mentioned in the first embodiment. The rotator type shading member 14c has a geometric center GC4 and a weight center WC4 offset from the geometric center GC4. The rotator type shading member 14c has a first weight portion 141c and a second weight portion 142c. The weight, specific weight, and the volume of the first weight portion 141c is greater than that of the second weight portion 142c. The first weight portion 141c has a first shading surface 143c. The rotator type shading member 14c further has a lowering inclined surface 146 gradually lowering from the first weight portion 141c to the second weight portion 142c, and the lowering inclined surface 146 is a concave lowering inclined surface.

Figure 9:
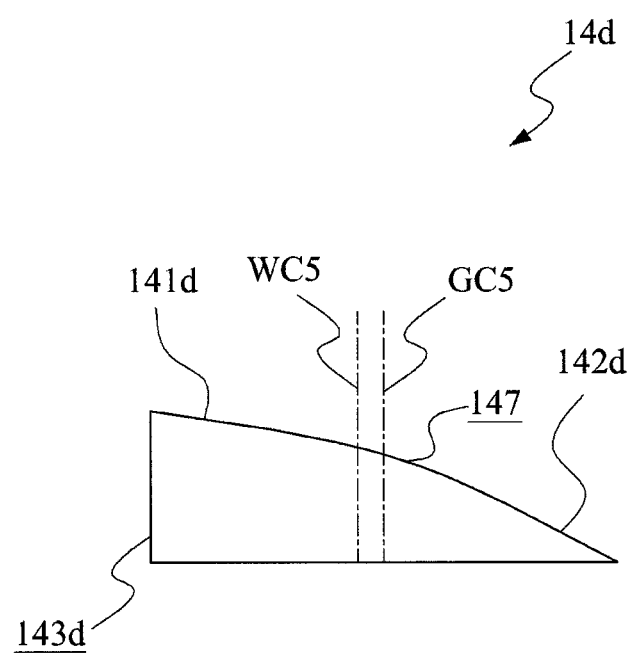
FIG. 9 illustrates the side view of the rotator type shading member in accordance with a fifth embodiment of the present invention.

Please refer to FIG. 9, which illustrates the side view of the rotator type shading member in accordance with a fifth embodiment of the present invention. In the fifth embodiment, another rotator type shading member 14d is applied to replace the rotator type shading member 14 as mentioned in the first embodiment. The rotator type shading member 14d has a geometric center GC5 and a weight center WC5 offset from the geometric center GC5. The rotator type shading member 14d has a first weight portion 141d and a second weight portion 142d. The weight, specific weight, and the volume of the first weight portion 141d is greater than that of the second weight portion 142d. The first weight portion 141d has a first shading surface 143d. The rotator type shading member 14d further has a lowering inclined surface 147 gradually lowering from the first weight portion 141d to the second weight portion 142d, and the lowering inclined surface 147 is a convex lowering inclined surface.

After reading the third embodiment to the fifth embodiment and FIG. 7 to FIG. 9, it is believable that any person skilled in the art can easily know that the lowering inclined surface can be a linear lowering inclined surface, a concave lowering inclined surface, a convex lowering inclined surface, or the combination thereof. If the bottom areas of the rotator type shading members were the same, the offset distance between the geometric center and the weight center of the rotator type shading member having a concave lowering inclined surface is greater than that of the rotator type shading member having a linear lowering inclined surface; and the offset distance between the geometric center and the weight center of the rotator type shading member having a convex lowering inclined surface is less than that of the rotator type shading member having a linear lowering inclined surface. Thus, it is able to effectively control the offset distance by designing the geometric structure of the rotator type shading member, and further able to control the sensing sensitivity of the optical sensing device.

After reading the technology as disclosed in the present invention, it is further believable that any person skilled in the art can further recognize that taking the first embodiment for example, in the optical sensing device 1, a rotator type shading member 14 is applied to replace the conventional movable type shading member; therefore, it is able to sense the inclination azimuth of the optical sensing device via the rotation of the rotator type shading member 14, so as to reduce the generation of the noise caused by that the shading member impacts the inner wall of the shading chamber, and further to prevent from the troubles in use or maintenance caused by the noise.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An rotator type optical sensing device, comprising:
   a circuit board;
   a shell assembled with the circuit board to form a blackbody condition space having a light emitting chamber, at least one optical sensing chamber, and a shading chamber spatially communicated with the light emitting chamber and the optical sensing chamber;
   at least one light emitting member arranged in the light emitting chamber for projecting at least one light beam into the light emitting chamber;
   a rotator type shading member having a geometric center and a weight center offset from the geometric center, and rotatably restrained within the shading chamber; and
   at least one optical sensing member arranged in optical sensing chamber to sense the light beam and accordingly send out a sensing signal;
   wherein the rotator type shading member includes a first weight portion and a second weight portion, and the weight of the first weight portion is greater than the weight of the second weight portion; and
   wherein the first weight portion has a first shading surface, the second weight portion has a second shading surface, and the area of the first shading surface is greater than the area of the second shading surface.

2. The rotator type optical sensing device as claimed in claim 1, further comprising an anti-static member arranged in the shading chamber to ground a static electricity generated when the shading member rotates in the shading chamber.

3. The rotator type optical sensing device as claimed in claim 1, wherein the weight center is located in the first weight portion.

4. The rotator type optical sensing device as claimed in claim 1, wherein the specific weight of the first weight portion is greater than the specific weight of the second weight portion.

5. The rotator type optical sensing device as claimed in claim 1, wherein the volume of the first weight portion is greater than the volume of the second weight portion.

6. The rotator type optical sensing device as claimed in claim 1, wherein the rotator type shading member further has a lowering inclined surface gradually lowering from the first weight portion to the second weight portion.

7. The rotator type optical sensing device as claimed in claim 6, wherein the lowering inclined surface is at least one of a linear lowering inclined surface, a concave lowering inclined surface and a convex lowering inclined surface.

* * * * *